United States Patent

[11] 3,600,875

| [72] | Inventors | Robert Konrad Buob<br>Como;<br>Giorgio Giraudi, Milano, both of, Italy |
|---|---|---|
| [21] | Appl. No. | 868,103 |
| [22] | Filed | Oct. 21, 1969 |
| [45] | Patented | Aug. 24, 1971 |
| [73] | Assignee | W. R. Grace & Co.<br>Duncan, S.C. |

[54] DEVICE FOR WRAPPING OBJECTS IN THERMOPLASTIC FILMS
10 Claims, 2 Drawing Figs.

| [52] | U.S. Cl. | 53/30, 53/33, 53/184, 53/230 |
|---|---|---|
| [51] | Int. Cl. | B65b 53/00 |
| [50] | Field of Search | 53/25, 30, 33, 184, 230 |

[56] References Cited
UNITED STATES PATENTS

| 3,108,881 | 10/1963 | Shaw et al. | 53/25 X |
| 3,468,412 | 9/1969 | Forman | 53/30 X |
| 3,479,788 | 11/1969 | Dreyfus | 53/30 X |

FOREIGN PATENTS

| 1,062,349 | 3/1967 | Great Britain | 53/184 |

*Primary Examiner*—Theron E. Condon
*Assistant Examiner*—Neil Abrams
*Attorneys*—John J. Toney, William D. Lee, Jr. and Edward J. Hanson, Jr.

ABSTRACT: A packaging apparatus and a method in which an object wrapped in a thermoplastics film is subject to three heating steps, each step taking place at a higher temperature than the previous one. During the first heating step the film is heated only sufficiently to maintain it in a wrapped condition; during the second the film is shrunk; and during the third the film is completely heat-sealed.

PATENTED AUG24 1971          3,600,875

*Inventor*
ROBERT KONRAD BUOB
GIORGIO GIRAUDI

By *William D. Lee Jr.*
*Attorney*

DEVICE FOR WRAPPING OBJECTS IN THERMOPLASTIC FILMS

The present invention relates to the shrinking and sealing of thermoplastics packaging films, and provides an improved method of and apparatus for shrinking and sealing such films.

The invention may be employed, for example, in the packaging of cubic, rectangular, polygonal or cylindrical articles. Objects such as these have hitherto been wrapped using semiautomatic or automatic wrapping machines, but most of these machines have suffered from the disadvantage that they are only suitable for use with plastics wrapping materials having more than one layer. Such materials have been coated with a thermoplastics coating which has a melting point considerably lower than that of the base material, so that a far lower sealing temperature has been needed in order to effect sealing of packages. Because of the relatively high temperature required to seal thermoplastics films comprising only such a base material and no coating, packaging machines of the prior art are not suitable for the sealing of such films. It is proposed by the present invention to provide an improved packaging machine which is itself capable of shrinking and sealing uncoated thermoplastics films, and also to provide an auxiliary shrinking and sealing apparatus for use with currently known forms of packaging machine which would otherwise only be useful for sealing coated films.

For the sealing of uncoated thermoplastics films, there are two requirements which are, in general, to be met. These are firstly the avoidance of friction or slip between the film to be sealed and the sealing element or elements used to seal the film, and secondly avoidance of too great an increase in the temperature of the film near the sealing point before the layers of film to be sealing are firmly pressed together. If the first requirement is violated then plastic deformation of the film may occur as the result of mechanical stress, and if the second requirement is violated then undesired and uncontrolled shrinkage may occur. Shrinkage of this kind is brought about as a result of the phenomenon of molecular orientation which is exhibited by such films and occurs because the film shrinks when heated to a temperature lower than that required to effect heat sealing. Thus it is desirable that the edges of the sheet of film to be sealed should be firmly held in position before application of the sealing element or elements.

According to one aspect of the present invention there is provided a method of producing a wrapped sealed object, said method comprising a wrapping step in which a heat-sealable thermoplastics film is wrapped around the object, a first heating step in which only sufficient heat is applied to the thermoplastics film to cause this to remain in a wrapped condition with folds of the film overlapped, a second heating step to cause heat shrinking of said film at a temperature higher than that of the first heating step and a third heating step in which the film is heated to a higher temperature than in the second heating step and in which the overlapped folds are completely heat-sealed.

The heating steps may be carried out either in the same apparatus, or in different apparatus. When the heating steps are carried out in different apparatus, the apparatus in which the first heating step is carried out may be a known apparatus, and that in which the second and third heating steps are carried out may be a new apparatus of the invention, adapted for use in conjunction with known apparatus.

In order to carry out a method of the invention, it is proposed that at least two sealing elements and a shrinking element, which may all be hotplates, should work in succession on the same part of the surface of film to be sealed, and that at least the last of such sealing elements should be mounted for reciprocation, the shrinking step occurring between the two heating steps. A method of sealing including two heating steps has advantages other than the more increasing of the sealing time. Thus it is possible for a thermoplastics film wrapped round an article to be packaged to undergo a first heating step in an apparatus which could, for example, be a packaging and sealing apparatus already known, and then to be transported to an apparatus of the invention in which the second and third heating steps could occur. In the case of a thermoplastics film such as polyvinylchloride free from any plasticizing agent, the film will remain strong throughout the first heating step without any deformation, if the temperature remains below the shrink temperature mentioned above, but may lose some of its initial elasticity. It has been found that during the first heating step the film does not exhibit a tendency for the folds to spring back after folding.

A convenient way of carrying out this method comprises folding a film which forms a package around an object to be packaged, carrying out a preliminary heating step at a first heating station, transporting the object to a second heating station where the film is shrunk, transporting the object to a third heating station, and there applying a third heating step. The temperature of the surfaces of the film to be sealed is sufficiently low at the first heating station to avoid deformation of the film, whereas at the third heating station the film may be heated to a sufficiently high temperature to obtain a perfectly welded seal. The object should be transported between the heating stations in such a way that any undesired contact between the film and any hotplate is avoided.

Since, in this type of method, the first heating step is not relied upon in order to produce a strong and durable seal, it is possible to practice such a method in conjunction with an apparatus for carrying out the first heating step of the type wherein the film to be sealed slides over heating plates.

According to a second aspect of the invention, there is provided apparatus for wrapping a product in a thermoplastics heat-sealable film, for shrinking the film and for heat-sealing the film around the product, said apparatus comprising means for folding such a film around a product; a first heating station for applying sufficient heat to the film to cause the film to remain in a wrapped condition with folds of the film overlapped; a second heating station for heat-shrinking the film at a temperature higher than that of the first heating station; and a third heating station for heating the film to a higher temperature than at the second heating station to heat-seal the film completely.

According to a third aspect of the invention there is provided auxiliary apparatus for use in conjunction with apparatus for wrapping a product in a heat-sealable thermoplastics film and heat-sealing the film around the product, said auxiliary apparatus comprising means for carrying out the second and third heating steps in the method of the invention but not the first heating step, and being capable of receiving products from such wrapping and sealing apparatus.

Difficulties have also been experienced hitherto in effecting the shrinking of thermoplastics films wrapped around objects, the step of shrinking normally being carried out after sealing. Heat has been supplied to a film to be shrunk by jets of heated air or infrared heaters, and also contact with heated surfaces has been employed for this purpose.

In any method involving the shrinking of a thermoplastics film after the film has been sealed, a difficulty which arises is caused by the fact that any air which is trapped within the enclosed film after sealing will expand when heat is applied to the film in order to shrink it. This expansion of the air located internally of the film thus acts in opposition to the intended shrinking action.

We propose to cause a thermoplastics film wrapped around a product to shrink prior to complete and total sealing of the film. When shrinking is achieved on this basis, the difficulty outlined above concerning trapped air does not arise. When shrinking is thus effected, it is possible to produce a film which is properly sealed and also shrunk in a controlled manner, this not being possible in shrinking methods of the prior art. Such prior art methods have involved, for example, the making of perforations in a film prior to carrying out the shrinking step, and the provision of such perforations undoubtedly impairs the tightness of the film.

It has further been found in the past that the low coefficient of heat transmission between air and a film to be shrunk is a disadvantage. In view of this, we consider that it is preferable to carry out shrinking by a method other than one involving the blowing of hot air at a film.

When shrinking is carried out before the complete sealing of the film, any air which happens to be located within the film at the time of shrinking has a readily available exit route through folds of the film which have juxtaposed and subjected to a preliminary gentle heating. When the shrinking step has been carried out, it is then possible to effect the complete and tight sealing of the film.

Because of the inefficiency inherent in a process of shrinking involving the blowing of hot air at a film, we propose to carry out the step of shrinking by a process involving contact between the film to be shrunk and a heated surface, such as that of a hotplate. Shrinking by this method offers a further advantage, i.e. that the area of shrinking of the film can more readily be controlled. For example, if it is desired to restrict shrinking to a small area of film, such as to only the part of the film adjacent one of the surfaces of the product wrapped, this may readily be achieved by applying the shrinking hotplate only to that particular area.

Further advantages also are offered when shrinking is effected by contact; for example, the dimensions of the apparatus in which the process is carried out may be smaller than if air is blown, and also the heating of the product wrapped in the film, which is normally not desired, can be minimized.

In a process involving a shrinking step carried out by bringing a heated surface into contact with a film to be shrunk, there are essentially two ways in which this may be done. Either the heated surface may be brought into contact with the film without any movement of the heated surface in the plane of the film at the point of contact, or the product may be slid over the heated surface. Where the latter method is employed, any undesired deformation and surrender of the desired qualities of the film may be avoided, since the temperature at which the film shrinks is lower than the temperature at which it becomes tacky and excessively plastic. Thus it is possible to effect shrinking while a product wrapped in the film is being conveyed between one station and another in an apparatus. It is however preferable to keep the pressure acting between the wrapped product and the heated surface as low as possible during the period when the product is transferred. The pressure can then be increased when the relative movement of the product over the heated surface is stopped, in order to improve the heat transmission to the film and obtain therefore a better and more uniform shrinkage of the film lying between the product and the heated surface.

We have found that there are two ways of incorporating a shrinking step in a method of sealing a film, which are particularly convenient. The first involves the incorporation of a shrinking station in a wrapping machine, in which case the shrinking station is located between a preheating station and a final heating station. The second involves the use of an auxiliary sealing apparatus intended for use in conjunction with a wrapping machine, as mentioned above, in which case the auxiliary apparatus of the invention is itself arranged to contain a shrinking station.

In order that the present invention may more readily be understood, the following description is given, merely by way of example, reference being made to the accompanying drawings, in which.

Figure 1:
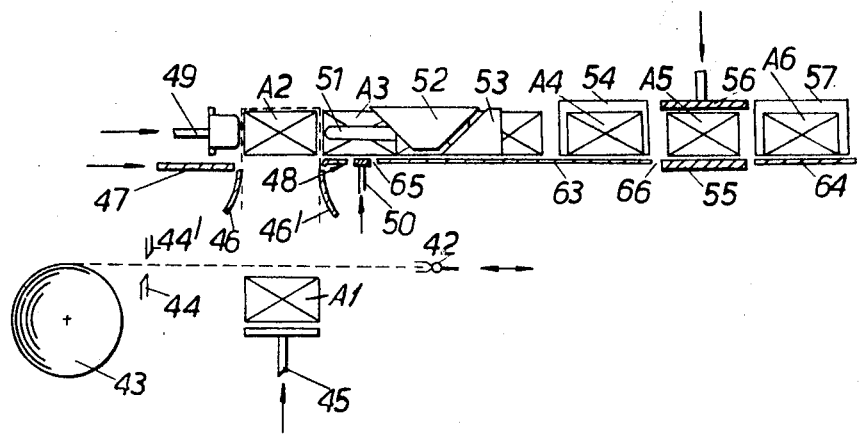
FIG. 1 shows schematically a wrapping machine of the invention.

Referring to FIG. 1, at the bottom left of the figure there is shown a roll 43 of thermoplastics film mounted so that film may be drawn off the roll by pulling it in a rightward direction, the roll then being constrained to rotate clockwise as shown in the figure and the film leaving the roll from its uppermost part. A pair of scissors is provided just to the right of the roll 43, the scissors comprising upper and lower scissor elements 44' and 44 respectively, the scissor elements 44' and 44 being mounted for cooperative vertical up and down movement. To the right of the scissor elements 44 and 44' there is disposed an elevator 45 having a flat horizontal surface, the function of the elevator 45 being selectively to raise objects after they have received a wrapping comprising a thermoplastics film.

A folding tool having folding elements 46 and 46' is located above the elevator 45, the folding elements 46 and 46' being at locations displaced the same distance to the left and to the right respectively of the vertical line passing through the center of the elevator 45. Just above and to the left of the folding element 46 there is located a pusher 49 which is mounted to be able selectively to apply a force on an object in a direction so as to move it to the right, and just below the pusher 49 there is located a folder 47. The functions of the pusher 49 and folder 47 will be apparent from the description of the operation of the apparatus, which description is to follow when the remaining integers of the apparatus have been enumerated.

The apparatus includes a horizontal table, and this table comprises three parts: a left-hand part 48, a central part 63 and a right-hand part 64. The left-hand table part 48 is disposed just above and to the right of the folding element 46', and the table portion 48 is provided at its left-hand end with a down-turned region. The folding elements 46 and 46' are each of a curved configuration, their distance apart becoming less in proceeding from the bottom to the top of the elements, and the two elements presenting convex surfaces towards each other. Gaps 65 and 66 are provided between the left-hand table portion 48 and the central table portion 63 and between the central table portion 63 and the right-hand table portion 64, respectively. In the gap 65 there is found a sealing tool 50, which may be brought into contact with the bottom surface of a thermoplastics film surrounding an object when in the position indicated at A3 in the figure, i.e. when straddling the gap 65. The gap 66 includes a shrinking plate 55, which is heated to a temperature such as to cause shrinking of a thermoplastics film into contact with the surface of which the plate 55 is brought. Located directly above the plate 55 and spaced from it is a reciprocating hotplate 56.

A series of ploughs 51, 52 and 53 are provided for completing the folding of the thermoplastics film around an object.

Below the central table portion 63, and to the right of the roll 43 mentioned above there is shown a set of tongs 42, which are provided for the purpose of drawing a length of film off the roll 43.

The operation of the embodiment of apparatus shown in FIG. 1 will now be described. The tongs 42 engage the outer end of the thermoplastics film wound around the roll 43, and the tongs then move to the right as far as the position in which they are shown in the figure. Thus a length of film is drawn over the top of an object to be packaged, such object being at this time in the position indicated at A1 in the figure, resting on top of the elevator 45 as shown. The scissor elements 44 and 44' now approach each other and sever the film at a point not far from the topmost part of the roll 43. When the cut has been made, a rectangular sheet of film is left hanging over the top of the object in position A1, and the left-hand and right-hand regions of this rectangular sheet become draped down the sides of the object, the tongs having become disengaged from the sheet. The elevator 45 now raises the object, so that it passes through the space between the folding elements 46 and 46' and is brought to the position indicated at A2 in the figure. As the object passes between the elements 46 and 46', the regions of the film which were previously draped down the sides of the object are now constrained to lie close to the sides, so that mechanical folding may take place. The folder 47 is at this time brought into operation, and is driven to the right as shown in the figure, to ensure that the portion of the film extending downwardly from the left-hand side of the object is constrained to adopt a location above the portion of the film extending downwardly from the right-hand side of the object, thereby preventing the left-hand portion of the film from being displaced to the left by the folding element 46' when the object, in the position A2, is driven to the right, this being the next stage in the process. The pusher 49 is driven to the right, impinges on the part of the film covering the left-hand side of the object, and causes the transport of the object from the position A2 to the position A3. The folder 47 and the pusher 49 are withdrawn to the left, so that the object remains stationary for a time in the position A3. In this position, as shown in the figure, the object straddles the gap 65 between the left-hand table portion 48 and the central table portion 63. While the object is at rest in position A3, the sealing tool 50 is brought into operation, being driven upwardly into contact with the overlapping folds of the film adjacent the bottom exterior surface of the object located within the enclosing film. When the sealing tool 50 has been removed downwardly, the object is again accelerated towards the right in the figure, and as the object is pushed through the ploughs 51, 52 and 53, the lateral folds are completed.

On reaching the position A4 in the figure, the motion of the object is again halted. In this position, the hotplates 54 are brought to bear on the front and back outside surfaces of the film. The action of the plate 54 is merely a preliminary heating action, and this step in the process does not seal the film.

When the plate 54 has been withdrawn from the film, the object is again driven to the right, and eventually reaches position A5. The object slides over the upper surface of the shrinking plate 55, and the heating plate 56 is brought to operate on the upper horizontal surface of the film. While the object is sliding over the plate 55, the portion of the film adjacent the bottom surface of the object is subjected to a shrinking action.

After treatment between the plates 55 and 56, the treatment is almost complete, but there still remains the final step of effecting the complete sealing of the film. This final step is carried out when the object is located between the reciprocating hotplates 57, shown at the extreme right-hand side of the figure, the object then being in the position A6. When the final step of sealing in the position A6 has been completed, the packaged object is then ready for passing on to a reception station (not shown).

Any air which happens to be located between the object and the film around it during the shrinking step of the process, which takes place when the object is located between the plates 55 and 56, can easily escape through the lateral folds of the film, which are at this time not completely sealed. Thus it is not possible for any air in this position to cause unwanted deformation or breakage of the film.

Figure 2:
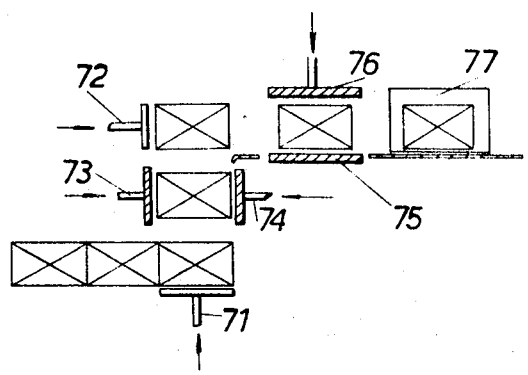
FIG. 2 shows schematically an embodiment of auxiliary apparatus of the invention including two shrinking stations.

Referring now to FIG. 2, there is shown an embodiment of apparatus of the invention which is particularly intended for use as an independent unit in conjunction with a wrapping machine. In the operation of this device, an object which has been wrapped in a thermoplastics film whose film folds have been preheated is driven upwardly by an elevator 71 and made to pass vertically between a pair of vertical hotplates 73 and 74. The plates 73 and 74 are shrinking plates, and after treatment between these plates the object is caused to rise further, and is brought under the action of a pusher 72, which now pushes the object in a direction to the right as shown in the figure, onto a horizontal table similar to that described with reference to the previous figures. In a gap in the horizontal table there is disposed the lower of a pair of horizontal hotplates 75 and 76, the plates 75 and 76 also being shrinking plates but intended to act on different faces of a film wrapped around an object. The film faces on which the plates 75 and 76 operate are the lower and upper horizontal faces respectively. After passing between plates 75 and 76, the object is then caused to pass between reciprocating hotplates 77 whose planes are vertical, and of which one is disposed in front of the object as shown in the figure and the other behind the object. The purpose of the reciprocating plate 77 is to carry out the final sealing step on the film. When a packaged object has been subjected to the action of the plates 77, then the sealing and shrinking treatment is completed.

We claim:
1. A method of producing a wrapped, sealed object, said method comprising the steps of:
  a. folding a heat-sealable thermoplastics film to form a package around an object;
  b. applying sufficient heat to the film in a first heating step to cause the film to remain in a folded condition with folds of the film overlapped but not sealed together;
  c. applying sufficient heat to the film in a second heating step to raise its temperature to a higher value than that of the film during the first heating step, effective to shrink the film around the object; and
  d. heating the film to a higher temperature than in the second heating step, effective to completely heat-seal the film in the overlapped folds formed in step (a).

2. A method as specified in claim 1, wherein during the second heating step the film is passed in contact with a shrinking plate at a temperature in the range 115° to 145° C.

3. A method as specified in claim 2, wherein the film is passed in contact with a pair of shrinking plates, at least one of which reciprocates.

4. A method as specified in claim 1, wherein the temperature to which the film is heated during the third heating step is in the range 150° to 180° C.

5. A method as specified in claim 1, wherein the third heating step comprises subjecting the film to the action of a pair of reciprocating hotplates.

6. Packaging apparatus comprising, in combination:
  a. means for folding a film around an object;
  b. at a first heating station, means for applying sufficient heat to said film to cause said film to remain in a wrapped condition with folds of said film overlapped;
  c. at a second heating station, means for applying heat at a temperature higher than that of the first heating station to heat-shrink said film; and,
  d. at a third heating station, means for heating said film to a higher temperature than at the second heating station, whereby the overlapped folds of said film are heat-sealed completely.

7. Apparatus as specified in claim 6, wherein a pair of hotplates are located at said second heating station at least one of said hotplates being reciprocable.

8. Apparatus as specified in claim 6, wherein pairs of reciprocable hotplates are located at said first and third heating stations.

9. Auxiliary apparatus for use in conjunction with packaging apparatus, said auxiliary apparatus comprising means for shrinking a film around an object and means for heat-sealing said film without means for folding said film around said object or means for holding said film in a wrapped condition, and said auxiliary apparatus further including means for receiving an object from said packaging apparatus.

10. Apparatus as specified in claim 9, wherein said shrinking means comprises a pair of heat-shrinking plates, at least one of which is reciprocable.